US010133742B2

(12) United States Patent
Soon-Shiong

(10) Patent No.: US 10,133,742 B2
(45) Date of Patent: Nov. 20, 2018

(54) EVENT ARCHIVING, SYSTEMS AND METHODS

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 799 days.

(21) Appl. No.: 14/400,547

(22) PCT Filed: May 24, 2013

(86) PCT No.: PCT/US2013/042647
§ 371 (c)(1),
(2) Date: Nov. 11, 2014

(87) PCT Pub. No.: WO2013/177515
PCT Pub. Date: Nov. 28, 2013

(65) Prior Publication Data
US 2015/0142753 A1    May 21, 2015

Related U.S. Application Data

(60) Provisional application No. 61/651,179, filed on May 24, 2012.

(51) Int. Cl.
*G06F 17/30* (2006.01)
*H04L 29/08* (2006.01)

(52) U.S. Cl.
CPC .... *G06F 17/30073* (2013.01); *G06F 17/3002* (2013.01); *G06F 17/30265* (2013.01);
(Continued)

(58) Field of Classification Search
CPC ........ G06F 17/30572; G06F 17/30864; G06F 17/30873; G06F 3/04815; G06F 17/30011;
(Continued)

(56) References Cited

U.S. PATENT DOCUMENTS 6,711,293 B1    3/2004 Lowe
7,015,831 B2    3/2006 Karlsson et al.
(Continued)

FOREIGN PATENT DOCUMENTS

JP    2004-510255 A    4/2004
JP    2007-129434 A    5/2007
(Continued)

OTHER PUBLICATIONS

Thudt, Alice, et al. "Visual mementos: Reflecting memories with personal data." IEEE transactions on visualization and computer graphics 22.1 (2016): 369-378.*
(Continued)

*Primary Examiner* — Nan Hutton
(74) *Attorney, Agent, or Firm* — Mauriel Kapouytian Woods LLP; Elaine K. Lee; Michael Mauriel

(57) ABSTRACT

Method of retrieving event information is presented. Memento objects can be recognized by an archive engine. Based on the recognition, the archive engine obtains information related to the memento object, possibly one or more recognizable features, and uses the information to search for events associated with a timeline that have corresponding tags. The archive engine can then return the event information as a result set to a user.

25 Claims, 3 Drawing Sheets

(52) U.S. Cl.
CPC .. *G06F 17/30336* (2013.01); *G06F 17/30749* (2013.01); *G06F 17/30817* (2013.01); *H04L 67/10* (2013.01)

(58) Field of Classification Search
CPC ......... G06F 17/30073; G06F 17/30749; G06F 17/30817
See application file for complete search history.

(56) References Cited

U.S. PATENT DOCUMENTS

| | | | |
|---|---|---|---|
| 7,016,532 | B2 | 3/2006 | Boncyk et al. |
| 7,477,780 | B2 | 1/2009 | Boncyk et al. |
| 7,565,008 | B2 | 7/2009 | Boncyk et al. |
| 7,680,324 | B2 | 3/2010 | Boncyk et al. |
| 8,694,357 | B2 * | 4/2014 | Ting ................. G06Q 30/02 705/7.29 |
| 2004/0107270 | A1 | 6/2004 | Stephens et al. |
| 2006/0155757 | A1 * | 7/2006 | Williams .......... G06F 17/30061 |
| 2006/0200475 | A1 | 9/2006 | Das et al. |
| 2007/0008321 | A1 | 1/2007 | Gallagher et al. |
| 2007/0038687 | A1 | 2/2007 | Carroll et al. |
| 2007/0214141 | A1 | 9/2007 | Sittig et al. |
| 2008/0239409 | A1 * | 10/2008 | David ............... G06F 17/30244 358/440 |
| 2008/0298766 | A1 | 12/2008 | Wen et al. |
| 2011/0026853 | A1 * | 2/2011 | Gokturk ............ G06F 17/30253 382/305 |
| 2011/0099199 | A1 | 4/2011 | Stalenhoef et al. |

FOREIGN PATENT DOCUMENTS

| | | |
|---|---|---|
| JP | 2007-280309 A | 10/2007 |
| JP | 2010-118056 A | 5/2010 |

OTHER PUBLICATIONS

Zajega, Francois, et al. "Medianeum: Crafting Interactive Timelines From Multimedia Content."*

Peesapati, S. Tejaswi, et al. "Pensieve: supporting everyday reminiscence." Proceedings of the SIGCHI Conference on Human Factors in Computing Systems. ACM, 2010.*

Office Action issued in Korean Patent Application No. 10-2014-7032443 dated Jul. 27 2016.

Office Action issued in Japanese Patent Application No. 2015-514220 dated Jul. 19, 2016.

European Search Report issued in European Patent Application No. 13794602.6 dated Dec. 18, 2015.

Office Action issued in Korean Patent Application No. 10-2014-7032443 dated Dec. 18, 2015.

Office Action issued in Japanese Patent Application No. 2015-514220 dated Dec. 1, 2015.

Reardon, "Verizon unveils 'Viewdini' video service for mobile devices," http://www.cnet.com/news/verizon-unveils-viewdini-video-service-for-mobile-devices/, pp. 1-6.

Vijverberg et al., "Two novel motion-based algorithms for surveillance video analysis on embedded platforms," http://dx.doi.org/10.1117/12.851371, Real-Time Image and Video Processing, SPIE 7724, 2010, pp. 1-10.

Office Action issued in Korean Patent Application No. 10-2016-7029701 dated Jan. 16, 2017, 5 pages.

Office Action issued in Korean Patent Application No. 10-2016-7029701 dated Jul. 31, 2017, 4 pages.

Office Action issued in Japanese Patent Application No. 2016-224128 dated Nov. 28, 2017, 10 pages.

Office Action issued Korean Patent Application No. 10-2016-7029701 dated Oct. 10, 2017, 7 pages.

ISA/KR, International Search Report and Written Opinion, Int'l Appln No. PCT/US2013/042647, dated Aug. 30, 2013 (12 pages).

Office Action issued in Korean Patent Application No. 10-2016-7029701 dated Jun. 28, 2018, 6 pages.

* cited by examiner

EVENT ARCHIVING, SYSTEMS AND METHODS

This application claims the benefit of priority to U.S. provisional application 61/651,179 filed May 24, 2012. This and all other extrinsic materials discussed herein are incorporated by reference in their entirety.

FIELD OF THE INVENTION

The field of the invention is information archiving technologies.

BACKGROUND

Recently Facebook® introduced the concept of a timeline where user information is organized according to when the information entered Facebook or based how a user links information to the timeline. Such an organization of information can be useful to the users by allowing them to review time-related events in their life. Unfortunately, the information stored in the Facebook timeline is inaccessible without Facebook and lacks any mechanism by which a user can be reminded of the information available.

Some effort has been directed to archiving information for later retrieval. For example, U.S. patent application 2004/0107270 to Stephens et al. titled "Method and System for Collaboration Recording", filed Oct. 27, 2003, describes a system where collaboration sessions are archived. Such an approach is useful for collaboration in communication sessions. However, the Stephens system also fails to provide memory cues to individual users.

Effort has also been directed to recognizing objects. For example co-owned U.S. patents to Boncyk et al. U.S. Pat. No. 7,016,532 titled "Image capture and identification system and process" filed Nov. 5, 2001; U.S. Pat. No. 7,477,780 titled "Image capture and identification system and process" filed May 20, 2004; U.S. Pat. No. 7,680,324 titled "Use of image-derived information as search criteria for internet and other search engines" filed Aug. 15, 2005; and U.S. Pat. No. 7,565,008 titled "Data capture and identification system and process" filed Jan. 26, 2005, describe various aspects of recognizing objects and returning content information based on the recognized object. However, these patents also fail to provide insight into binding interesting events to a person's timeline.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Ideally people or other entities could archive events and have mementos that can be used to recall the events. Thus, there is still a need for archival systems capable of triggering or restoring memories to users.

SUMMARY OF THE INVENTION

The inventive subject matter provides apparatus, systems and methods in which one can track one or more events in their lives according to a timeline and retrieve information related to the event via a memento. One aspect of the inventive technology includes a method of retrieving event information. Contemplated methods allow users to access an event archive engine via one or more interfaces (e.g., cellphone, API, browser, social network, search engine, etc.). The archive engine is preferably configured to receive an event object, possibly over a network, where the event object comprises data representative an occurrence in a life of an entity (e.g., a person, animal, pet, building, vehicle, or other item). For example, the method can include the archive engine receiving a video of a concert captured by a user's cell phone where the video can be considered the event object. The archive engine can also bind the event object to a timeline associated with the entity where the timeline represents multiple event objects organized by time. Yet another step of the method includes selecting one or more event objects to be bound, or associated with a memento object. The archive engine can register the memento object with the event objects by mapping one or more recognizable features, possibly via intermediary indexing information, of the memento object to the select event objects. The archive engine is capable of retrieving the selected events through deriving one or more derived features from a digital representation of the memento object and using the derived features as basis to search for the selected events.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based event archiving system, various alternative configurations are also deemed suitable and may employ various computing devices including servers, interfaces, systems, databases, agents, peers, engines, controllers, or other types of computing devices operating individually or collectively. One should appreciate such terms are deemed to represent computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including retrieving event information based on recognition signals sent to an archival engine.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context, the terms "coupled to" and "coupled with" are also used euphemistically to mean "communicatively coupled with".

Figure 1:
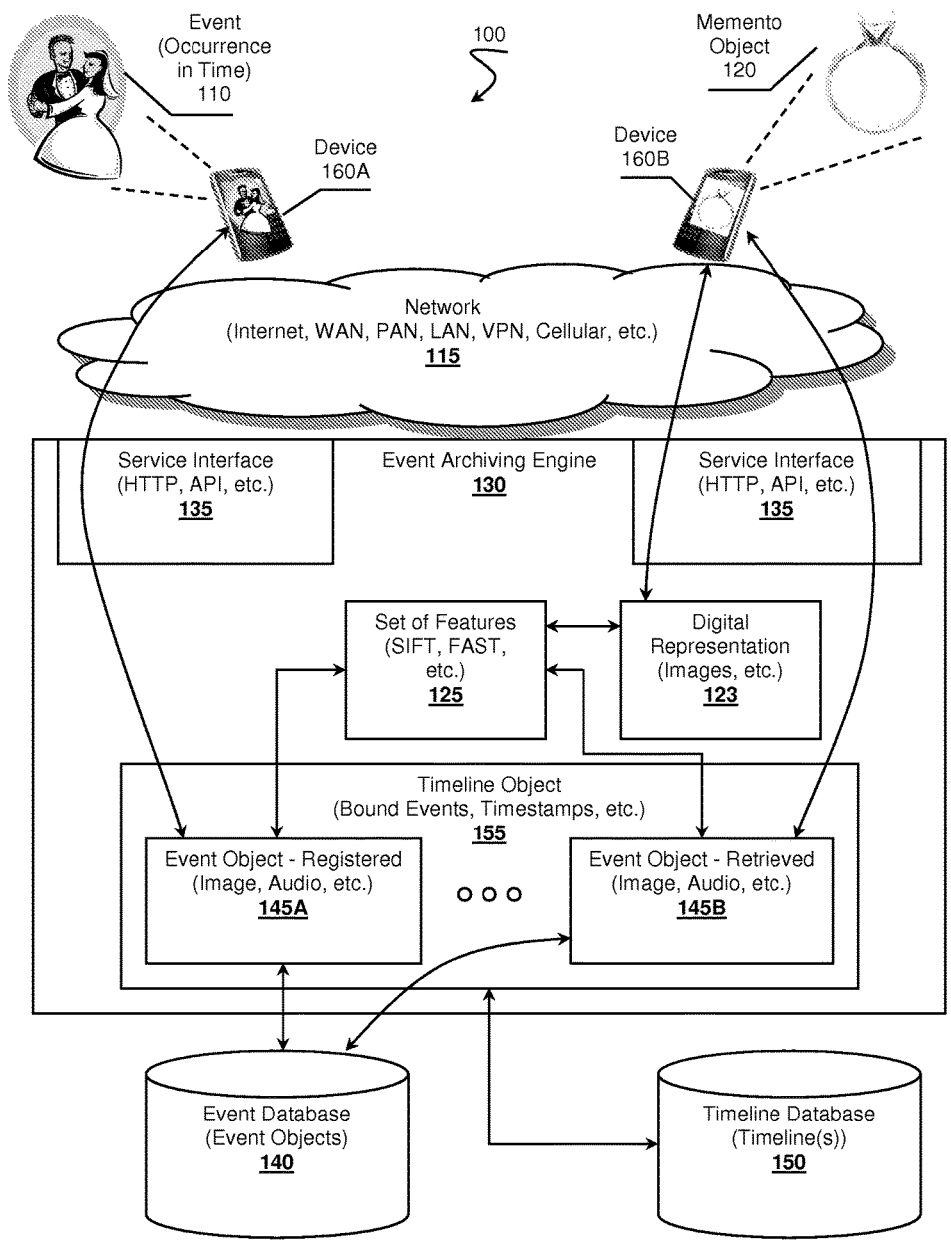
FIG. 1 illustrates a schematic for event archiving ecosystem.

FIG. 1 illustrates archival system 100 comprising event archiving engine 130 configured to or programmed to store one or more event objects 145A through 145B according to a timeline. Examples of computing platforms that can be suitably adapted for use with the inventive subject matter include search engines, social networking sites, on-line communities, CRM databases, source control engines, forums, product review sites, on-line gaming platforms, multiplayer on-line games, or other computing systems that store information.

The following discussion describes event archiving engine 130 as providing access to event-memento for-fee services over a network 115 where event archiving engine 130 comprises one or more servers possibly operating as a Platform-as-a-Service (PaaS), Infrastructure-as-a-Service (IaaS), Software-as-a-Service (SaaS), or other type of platform. However, one should appreciate that event archiving engine 130 could represent other computing devices including a cell phone, a personal computer, a tablet, or other device. Thus, in some embodiments, a user can install an app on their smart phone where the app programs the cell phone to operate as event archiving engine 130.

In the example shown, a user of device 160A captures data of event 110 representing an occurrence in time. For example, an individual might be attending a wedding or sporting event where they use a camera on their cell phone to capture an image, or other content, of the wedding or sporting event. Content related to event 110 captured by device 160A can be submitted to event archiving engine 130, possibly over network 115 (e.g., network connection, Internet, LAN, WAN, VPN, PAN, etc.). In the example shown, device 160A is illustrated as a cell phone. However, other types of devices could also operate as device 160A including a tablet, a computer, a security camera, or other sensor device. Further, the content representative of event 110 comprises a broad spectrum of data modalities including image data, video data, audio data, speech data, motion data, acceleration data, temperature data, text data, biometric data, or other types modalities of data. Event archiving engine 130 receives the content related to event 110 over service interface 135 (e.g., cellular interface, GUI, API, HTTP server, etc.) and instantiates one or more of event objects 145A through 145B, collectively referred to as event objects 145.

Even archiving engine 130 stores occurrences during a person's life as event objects 145 where event objects 145 comprise data representative of the occurrence or event 110. Each event object 145 can be considered a distinct manageable object relative to other objects in the system. For example, event object 145 can be considered an image, a video, or other types of data that can be captured as discussed above along with any additional content. Event objects 145 can also include metadata (e.g., attributes, properties, characteristics, etc.) that describes the nature of the event or occurrence. In some embodiments, a user might select an image from a local computing device, perhaps device 160A, and upload the image file to event archiving engine 130 via service interface 135 (e.g., FTP). The user can then instruct event archiving engine 130 to instantiate event object 145A from the image file and from any additional provided content (e.g., time stamps, comments, etc.). Providing metadata allows event archiving engine 130 to manage, analyze, retrieve, or otherwise manipulate event objects 145. In order to manage event objects 145 with respect to time, event objects 145 can include one or more time stamps that allow the archive engine to organize event objects 145 based on time to construct a timeline as represented by timeline object 155.

Event objects 145 comprise a wide variety of data types. Preferred event objects comprise a media object or possibly a multi media object. Example data types that can be incorporated into an event object 145 includes: audio data, video data, image data, motion data, acceleration data, temperature data, location data, time data, metadata, identification data, preference data, game data, sensor data, security data, or other types of data.

For further clarity with respect to event objects 145, event objects 145 can be considered a representation of one or more events or occurrences that can be "recalled" or "remembered". Example occurrences that can be archived or retrieved can include a party, a concert, a sporting event, a news event, a project task, an accident, or other types of occurrence. In some embodiments, event objects 145 can be automatically categorized based on contextual ambient data (e.g., sensor data) or based on users-supplied data (e.g., a calendar).

As an example of contextual auto creation of event objects 145, consider a scenario where a person is attending a wedding. Event archiving engine 130 can obtain a data feed from the person's cell phone where the data feed includes geo-location data from GPS sensor, timestamp data, video data, user ID (e.g., phone number, IP address, email address, user name, etc.) or other sensor feed data. Event archiving engine 130 receives the data feeds possibly along with external information available from other sources. For example, the external information could include entries within the person's calendar having text of the form "Attend Wedding". The data feeds and external information can automatically trigger instantiation of one or more of event object 145. A corresponding wedding event object could include the time of the wedding, location of the wedding, and one or more portions of content that commemorate the occurrence. Thus, event archiving engine 130 can include one or more rules sets stored in memory that include contextual triggering criteria that cause occurrence content to be instantiated as an event object 145.

Event objects 145 can be stored in event database 140. Event database 140 can be housed within device 160A, within event archiving engine 130, external to both devices, or can be disposed at remote locations over network 115. In some embodiments, event database 140 can be part of a search engine, CRM system or other type of data retrieval system.

Even archiving engine 130 can also manage timelines as distinct objects represented by timeline object 155 where a timeline comprise time-ordered event objects 145. Thus, the timeline objects 155 can represent interesting events that occurred during a person's life. One should appreciate several points. First, a timeline can be segmented as desired. Example segmentations can include segmenting the timeline based on stages of life, a year, a month, a day, or other time spans or criteria. Second, a timeline can be associated with any entity, possibly including a pet, a person, a place, a building, a vehicle, company, an animal, an organization, a group, a family, a school, a yearbook, or other type entity. Third, timeline objects 155 can include their own attributes by which they can be organized, managed, analyzed, or otherwise manipulated. For example, timelines can be distinguished by location information or user identification information. In such a case, event archiving engine 130 could provide a demographic analysis of all timeline objects 155 that are involved with a GPS coordinate or could give rise to a space-time line where the timeline is organized by spatial or location coordinates as well as timestamp coordinates.

Similar to event objects 145, timeline objects 155 can be stored in timeline database 150 where timeline objects 155 can be retrieved. As event archiving engine 130 processes event objects 145, event archiving engine 130 can query timeline database 150 to retrieve desired timeline objects 155 based on one or more timeline attributes (e.g., user ID, geo-location, type of timeline, etc.).

As illustrated, event objects 145 can be associated with one or more memento objects 120, which can be leveraged by a user to retrieve event object 145 or information associated with event object 145. Event archiving engine 130 can select one or more event objects 145 to be linked or registered with memento object 120 according to different techniques. In some scenarios, event objects 145 are randomly selected, possibly where event objects 145 that fall within a time span on the timeline or based on a geo-location attribute value. In other embodiments, event objects 145 can be selected through preferences, user selection, voting, ranking, or other techniques.

Memento objects 120 can include a broad spectrum of objects including 2D objects (e.g., an image, photograph, card, poster, etc.), a 3D object (e.g., a physical thing, a figure, a car, etc.), or even a 4D object (e.g., a figure that moves, time varying object, objects with multiple dimensions of relevance, etc.). Preferably memento objects 120 can be recognized by event archiving engine 130 based on digital representation 123 of memento object 120. Digital representation 123 can comprise various forms of digital data includes image data, video data, audio data, sensor data, or other data modalities. Example techniques that can be used to recognize objects that can be adapted for use with the inventive subject matter include those disclosed in co-owned U.S. Pat. Nos. 7,016,532; 7,477,780; 7,680,324; and 7,565,008.

Event archiving engine 130 registers one or more sets of recognizable features 125 of memento object 120 with selected event objects 145. In the example shown, event object 145A is registered and later retrieved as event object 145B. Device 160B, which could be the same device as device 160A, captures an image of a wedding ring that is to be memento objects 120. Digital representation 123 comprises the image and is analyzed by event archiving engine 130, possibly according type of data, to generate set of features 125. Set of features 125 then becomes indexing information for event object 145A and is registered with memento object 120 within timeline object 155. At a later time when event archiving engine 130 encounters at least a portion of set of features 125 again, event archiving engine 130 can retrieve event object 145B and return corresponding "remembered" information to device 160B.

Consider another example use case where memento object 120 comprises a Christmas card. Engine 130 can analyze features of the card to generate a set of recognizable features 125 (e.g., size, shape, dimensions, color, SIFT features, bar codes, encoded data, non-encoded data, descriptors, font, color histogram, or other attributes). The features can then be registered with event objects 145 that correspond to the previous Christmas, for example. The set of recognizable features 125 can used to generate indexing information for event objects 145. In some embodiments the recognizable features or values are used as the index while in other embodiments, the recognizable features are used as a basis for recognizing memento object 120 as a valid memento object. The valid memento object can then be associated with indexing information to access relevant event objects 145 within timeline object 155.

Archiving engine 130 can retrieve one or more event objects 145 by analyzing digital representation 123 of memento object 120 to derive one or more sets of features 125. To continue the previous example, a person that receives the Christmas card can image the card with their cell phone (e.g., device 160B). The card has been previously "activated" so that archiving engine 130 recognizes the card via set of features 125, which can include derived features corresponding to one or more of the recognizable features of memento card object; possibly within a calculated confidence level. Archiving engine 130 uses the set of features 125, or other information related to the recognized memento object, to find corresponding event objects 145B. Event objects 145 can then be presented on output device 160B (e.g., cellphone, browser, kiosk, appliance, television, etc.).

One should appreciate that set of features 125 are derived from digital representation 123 of memento object 120 rather than event 110. This approach provides for registering set of features 125 from memento object 120 with event object 145A within timeline object 155. When archiving engine 130 encounters similar features again, it can retrieve the registered event object as represented by event object 145B. Thus, memento object 120 serves as the basis for "remembering" or "recalling" event 110.

A suitable technology for retrieving or presenting event objects 145 that can be adapted for use with the presented subject matter includes Verizon® Viewdini™, which allows for searching or retrieve streamed content (see URL news-.cnet.com/8301-1023_3-57439056-93/verizon-unveils-viewdini-video-service-for-mobile-devices/). Viewdini can be augmented to allow it to recognize features of memento object 120 to retrieve event objects 145. Viewdini can be adapted to present timeline information as a series of available streamed events to the user. Further, upon recognition of memento object 120, Viewdini can be adapted to jump to a specific event object 145 on the timeline and provide "time shifting" capabilities to allow the user to shift their reference point on the timeline by moving to relatively earlier times or future times. For example, to time shift a person can shift memento object 120 to various positions or orientations with respect to the field of view of device 160B. Perhaps placing memento object 120 on the right side of the field of view might cause archiving engine 130 to fast forward through event objects 145 in timeline object 155. Similarly, placing memento object 120 near the left side of the field of view could cause archiving engine 130 to rewind back through event objects 145 in timeline object 155. Still further, one could jump from one timeline object 155 to another based on the content presented in event objects 145. For example, if two people are presented in a video event object, the interface can allow the user to jump to a timeline associated with some or all of the people in the video.

Archiving engine 130 can obtain or otherwise receive content related to event 110 used to instantiate event objects 145 through numerous techniques. In some scenarios, the event content can be pushed to archiving engine 130 from capturing device 160A. Alternatively, archiving engine 130 can pull event content from capturing device 160A. Still further archiving engine 130 can automatically retrieve event content, possibly over network 115, on periodic basis or other triggering condition. Such an approach allows for automatic construction of timeline object 155 with minimal user interactions; assuming proper authorization is granted.

One should appreciate that event objects 145 can be bound to more than one timeline object 155. For example, a video of a birthday party might include images of several individuals. Archive engine 130 can recognize the individuals, or other objects in the video or event content, and determine if the individuals have their own timelines. If so, assuming properly authorization, archiving engine 130 can bind event object 145A to the timelines of the recognized individuals.

Although the disclosed subject matter is presented with respect to a central archiving engine, one should appreciate that the various roles or responsibilities of the engine can be distributed among multiple devices. For example, a cellphone can operate as a recognition engine to derive set of features 125 from memento object 120. Further, engine 130 can be distributed across multiple computing devices including multiple search engines, network infrastructure equipment (e.g., switches, routers, etc.), device 160A or 160B, social network services, cloud services, set top boxes, gaming devices, or other devices.

Consider a use-case where a person attends a concert or other event. The user captures data associated with the concert through their smart phone. The captured information could include a recording of conversations, video of the band, images of friends, or other event content. The captured data can integrate into event objects 145 via archiving engine 130. Archiving engine 130 assigns the event content data, possibly based on time stamps, to the user's timeline. Further, archiving engine 130 can assign some, or all, of the event content data to the venue's timeline if location data is available. In some embodiments, the user could also capture an image of their concert ticket to register the ticket as memento object 120 for event 110. In the future, whenever the user images the ticket again, they can quickly recall the event information (e.g., conversation, video, images, etc.).

It is also contemplated memento objects can be produced by a memento service (e.g., a 3D printer, CNC machine, a manufacturing web site, etc.) connected with archiving engine 130 or that owns or operates archiving engine 130. The memento service can use event data to construct or manufacture memento objects 120 based event objects 145 in timeline object 155. For example, perhaps for a child's birthday, a set of "trading cards" can be manufactured where each card corresponds to an event during the last year of the child's life thereby forming a "year in review". Each trading card can be activated (e.g., registered set of features 125 to memento object 120) to allow a person to obtain the corresponding event data by capturing an image of the card. The cards can include images obtained from the corresponding events. Another example could include production of a keepsake, possibly a doll, an action figure, a charm, a plate, jewelry, game token, or other type of items. In some embodiments, multiple individuals might receive the same memento object 120; the same charm for example. In such cases, event objects 145 or timeline objects 155 can be differentiated based on additional information available to the system including user identification, location, device identification, or other factors. Alternatively, each duplicate memento object simply points to the same event objects.

Figure 2:
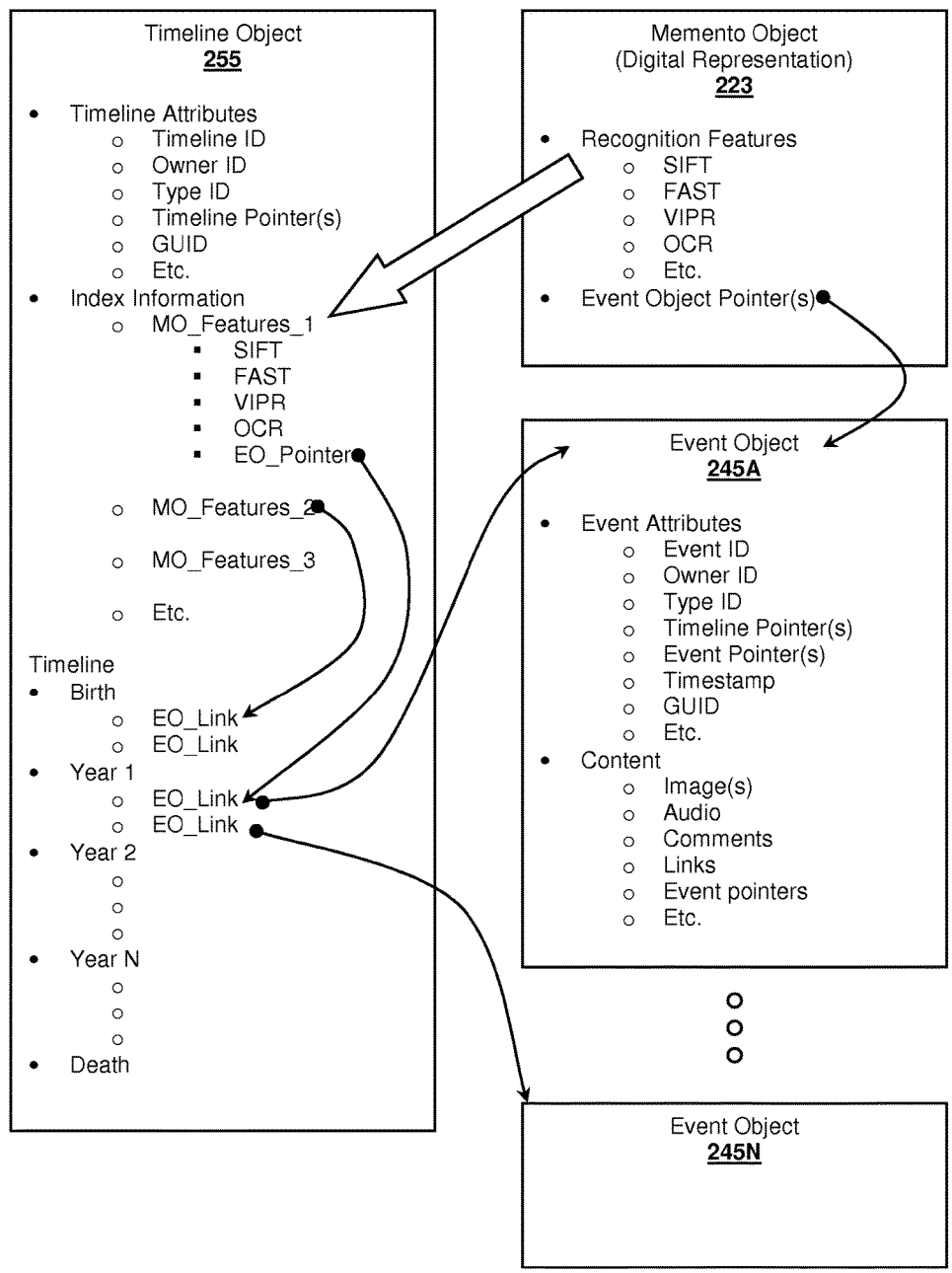
FIG. 2 illustrates links among timelines, mementos, and event objects.

FIG. 2 illustrates a relationship among timeline objects 255, memento object 223, and event objects 245A through 245N, collectively referred to as event objects 245. Timeline object 255 represents events ordered according to time and associated with an entity (e.g., a person, a vehicle, a building, a location, etc.). Timeline object 255 can also be distinct manageable object within the describe ecosystem where timeline objects 255 can be instantiated, moved, copied, forked, deleted, inventoried, or otherwise managed. Further, timeline object 255 or other objects in the system can be stored on a non-transitory computer readable medium.

Timeline object 255 can include numerous features that aid in management of timeline object 255. In some more preferred embodiments, timeline object 255 can include one or more timeline attributes that describe the nature of timeline object 255. Example attributes can include an identifier of the timeline, an owner ID (e.g., username, key, token, etc.), a timeline type identifier (e.g., personal timeline, building timeline, location timeline, etc.), pointers or references to other timelines, user demographics, event object count, time range, location or position, or other attributes. As entities access or manage timeline objects 255, the entity can retrieve timeline objects 255 by submitting one or more queries to timeline databases where the queries can be defined in terms of the timeline attributes. For example, one could retrieve of all timeline objects 255 associated with a set of geo-location coordinates and with males between the ages of 18 to 34.

Timeline objects 255 can further including index information representing one or more sets of recognizable features related to memento objects 223. The indexing information can include various acceptance recognition criteria defined as a function for recognition features where the criteria indicate satisfaction conditions or requirements that should be met to access corresponding event objects. Thus, timeline objects 255 can be considered a mini or micro object recognition database storing sets of recognition features that point to event objects 245. As illustrated, the indexing information can include scale invariant features (e.g., SIFT; see U.S. Pat. No. 6,711,293 to Lowe et al.), corner detecting features (e.g., FAST; see URL www.edwardrosten.com/work/fast.html), visual pattern recognition features (e.g., ViPR®, from Evolution Robotics; vSLAM, see U.S. Pat. No. 7,015,831 to Karlsson; etc.), audio pattern recognition features, optical character recognition features, or other recognition features. Each feature sets can also include one or more pointers that reference a corresponding event object 245 in the timeline. Further, the indexing information can include conditions that should be satisfied in order for an archiving engine to retrieve a corresponding event object.

Timeline objects 255 also include a timeline where events are ordered according to time. In the example show, the timeline represents a person's timeline from birth until death where some events have already been defined. The events within the timeline can be represented as actual data constructs within the timeline or can be externally stored as event objects 245 as illustrated. When event objects 245 are external to timeline object 255, the timeline can be constructed with links or other pointers to event objects 245. For example, the pointers represented by EO_Link could include URLs, URIs, network address, digital object identifiers (DOI), event GUIDs, index key, or other addresses that resolve to a location where corresponding event objects 245 are stored.

In some embodiments timeline object 255 can be instantiated based on a template timeline, possibly corresponding to the type of entity. In such scenarios, the timeline can be a priori created to have proper delineations (e.g., seconds, minutes, hours, days, weeks, months, years, etc.) with place holders for event objects. One should further appreciate that timeline object 255 represents one possible structure for timelines. Alternatives include creating an ordered link list of event objects or creating an order list of pointers to event objects 245.

Event object 245A is presented as a possible structure for event objects. Event object 245A can include event attributes that describe the nature of the corresponding event. Similar to timeline attributes, the event attributes allow various computing device to search for event objects 245 using event attribute-based queries. Example event attributes can include an event ID, event object ID, owner ID, event type ID, pointers or links to related timeline objects, pointers to other event objects, time stamps, location stamps, or other types of attributes. Further event objects 245 can include event content or links to event content. For example, event object 245A might be instantiated with actual content and could include image data, audio data, video data, links to external content, or other types of content data.

Figure 3:
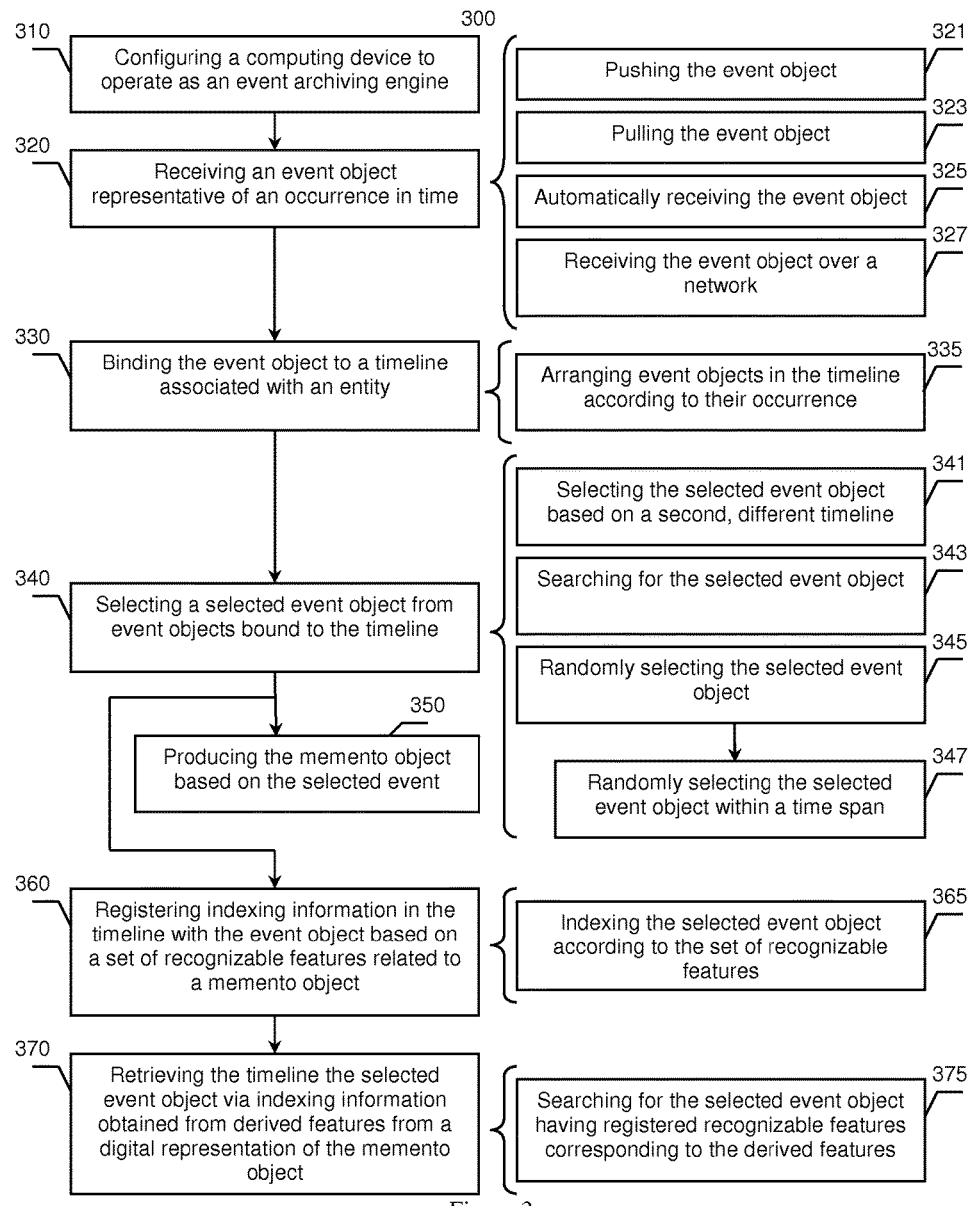
FIG. 3 presents a possible method of retrieving event information based on a memento.

FIG. 3 presents method 300 of retrieving event information where an entity can register sets of recognition features of a memento object with event content. The entity can then use the memento object as a foundation for retrieving the event content. One should appreciate that the memento object represents a real-world physical object that could comprise at least two dimensions (e.g., shadow, images, pictures, paintings, etc.), three dimensions (e.g., action figure, face, ring, moving video, etc.), four dimensions (e.g., moving action figure, moving vehicle, etc.), or more dimensions of relevance.

Step 310 includes configuring a computing device to operate as an event archiving engine. Example computing devices can include servers, workstations, cell phones, kiosks, appliances, vehicles, search engines, CRM systems, or other types of computing devices. The computing device can be configured through installation of one or more sets of instructions within a memory of the computing device where the instructions cause the computing device's processor to execute the various steps of method 300. For example, a cell phone can be configured to operate as a personal event archiving engine by installing a suitably configured app on the cell phone. In other embodiments, a user might use their personal computing device to engage a remote server operating as a for-fee service that archives and retrieves event information. Further the one or more computing devices can be programmed to access at least one of the following interfaces in support of accessing the services of the event archiving engine: an application program interface, a search engine interface, a social network interface, a memory access interface, a cell phone interface, a browser interface, a sensor interface, or other interface through which the engine can be accessed.

Step 320 includes receiving an event object representative an occurrence in time. Example events include a party, a concert, a sporting event, an accident, a medical emergency, an event in a virtual world, a game event, or other type of occurrence. The event object could be obtained through multiple techniques. In some embodiments, the event object is instantiated from event content reflecting the occurrence. In other embodiments, the event object can be retrieved from a database of event objects.

Consider an example where a person wishes to "recall" a sporting event. The person could be presented with multiple choices by which the event archiving engine can receive the event object. As discussed above, event objects can include a media object having various types of multi-media data. Example multi-media data includes audio data, video data, image data, motion data, acceleration data, temperature data, location data, time data, metadata, identification data, preference data, game data, security data, or other types of data. Step 321 could include pushing the event object to event archiving engine. For example, as the person captures images, audio, or other data from the sporting event via their cell phone, the cell phone can package the event data into an event object and push the event object along with its associated event content data to the event archiving engine. Alternatively, step 323 could include the event archiving engine pulling the event object from the cell phone or other computing device. Step 325 could include automatically receiving the event object perhaps based on a contextual query submitted to the event data. One should appreciate that the event objects can be received over a network as suggested by step 327 when necessary or required.

Step 330 includes binding the event object to a timeline associated with an entity where the timeline comprises a plurality of event objects organized according to time. An entity could include a person, an animal, a company, an organization, a group, a family, a school, a yearbook, a building, a vehicle, or other type of entity. The event objects can be bound automatically or manually to the timeline possibly through a user interface. Each timeline can include time demarcations based on a life time, a life stage, a year, a month, a week, a day, an hour, or other temporal segmentation. Consider a scenario where a person's tablet computer operates as a personal witness (e.g., event archiving engine) that automatically constructs a witnessed timeline object, perhaps on a daily basis. Throughout the days, weeks, or months, the tablet captures images of the person's events. The tablet can use the images to create event objects and automatically construct a timeline by binding the images as event objects to the witnessed timeline object. As the event objects arrive, the tablet can arrange the event objects in the timeline according to their occurrence as suggested by step 335. Thus, the timeline object builds up a time-ordered, or even possibly space ordered, list of events. Further, the engine can bind the event objects to multiple timelines perhaps based on recognizing object within the event object's event content data. As an example, the event object could include an image or picture of several friends. The event archiving engine operating as a recognition platform can recognize the face of each friend and then bind the event object with the image to each recognized person's timeline.

In preparation for registering an event object with a memento, step 340 includes selecting a selected event object from event objects bound to the timeline. One should appreciate that the selected event object could be a priori independent of the timeline before selection. Thus, step 330 could occur after the selection process of step 340. The event object can be selected through various techniques. Typically a user will cause the event object to be instantiated based on event content data (e.g., images, audio, video, temperature, biometrics, etc.). Further, a user or other entity could search for the event object as suggested by step 343. For example, the timeline might include many a priori bound event objects. At a later time, the user can search for event objects within the timeline having specified time stamps, content, or other required attributes.

It is also contemplated that the selected event object can be selected based on a second, different timeline as suggested by step 341. Consider a scenario where two individuals have separate, distinct timelines and participate in a common event; a medical emergency for example. Both individuals might create event objects in their respective timelines. One individual might wish to create a recallable event based on an image of a scar incurred and wish to select events based event objects that overlap among the two timelines. Such an approach would be considered advantageous when constructing a medical timeline shared between a patient and a healthcare provider.

It is contemplated that some timelines will comprise many event objects having substantially similar timestamps associated with an event. For example, a birthday party could include hundreds of pictures taken within an short time span. In such circumstances, step 345 can include randomly selecting the selected event object possibly from a set of available event objects. Additionally, the selected event object could be selected based on additional criteria that could further limit the set of available event objects. Perhaps the selected event object is selected from event objects within a specified time span on the time line as suggested by step 347. Referring back to the birthday example, the user might specify a time span of around a particularly interesting sub-event (e.g., blowing out the candles, opening presents, etc.). The time span can be defined based on a relative time (e.g., plus or minus around a time point) or based on an absolute time (e.g., from a beginning time to an end time).

Step 360 can include registering indexing information in the timeline with the selected event object based on a set of recognizable features related to a memento object. The set of recognizable features can be consider one or more indices by which the selected event object can be retrieved from the timeline. The set of recognizable features can be derived from applying one or more algorithms to a digital representation of the memento object. For image data within the digital representation example algorithms could include SIFT, FAST, ViPR, BRISK, OCR, or other image processing algorithms. Video data could be processed by similar image processing algorithms, vSLAM, Video Content Analysis (see "Two novel motion-based algorithms for surveillance video analysis on embedded platforms prohibited" by Vijverberg et al.; see URL dx.doi.org/10.1117/12.851371), or other video processing algorithms. Features from audio data in the digital representation can be extracted based on automatic speech recognition (ASR) using Dynamic Time Warping, Hidden Markov models, neural networks, or other algorithms. It should be appreciated that the set of recognizable features can comprise features that align with the various modalities of the digital representation of the memento object. The set of recognizable features can include audio data characteristics, image data characteristics, color, shape, dimension of relevance, make, model, encoded data, non-encoded information, texture, or other information derivable from a digital representation. Thus, the set of recognizable features could be represented as a vector where each member of the vector represents a different modality (e.g., image, audio, video, spatial, temporal, temperature, etc.). Further each member of the vector could include a listing of relevant features. The set of recognizable features can also include one or more criterion that should be satisfied with respect to the features to determine a successful recognition "hit". For example, if only image data is used to represent to memento object where the set of features only comprise SIFT features, then the recognition criteria might require that at least 75% of the features in must be present for the memento object to be recognized and trigger retrieval of corresponding event objects. The recognition criteria can be automatically determined by the event archiving engine, by the user, or other techniques.

Step 365 can include indexing the selected event object according to the set of recognizable features. The selected event object can be indexed by storing the selected event object within an event database by using the one or more members of the set of recognizable features as an index. Additionally, the timeline can be updated with the set of recognizable features as an index in manner were the timeline itself, at least as some level, operates as a small recognition database and retrieves event objects based on the event archiving engine encountering similar recognizable features. The selected event objects can be integrated into the timeline or can be referenced by the timeline through a pointer or link (e.g., network address, GUID, etc.).

Step 370 includes retrieving from the timeline the selected event object via the indexing information obtained at least in part from at least one derived feature derived from a digital representation of the memento object where the derived feature corresponds to a recognizable feature in the set of recognizable features. For example, at a later time when an entity wishes to recall or remember the event object, they can capture a new digital representation of the memento object to which the event object has been registered. The archiving engine applies one or more algorithms (e.g., SIFT, BRISK, FAST, vSLAM, etc.) to the new digital representation to obtain one or more derived feature. Similar to the recognizable features, the derived features can include audio data characteristics, image data characteristics, color, shape, dimension of relevance, make, model, encoded data, non-encoded information, attributes, texture, location, time, or other feature derivable from the new digital representation. The engine then uses the one or more derived feature to query the timeline for registered event objects that have been indexed based on similar recognizable features. In some embodiments, as suggested by step 375, the timeline can be considered to configure the event archiving engine as an event searching engine that searches the timeline for event objects having registered recognizable features corresponding to the derived feature. Thus, the event archiving engine is able to "recall" or "remember" event objects based on the memento. One should appreciate that the indexing information used to retrieve event objects relate to the memento objects rather than the content of the event object itself.

Step 350 can optionally includes producing the memento object based on the selected event object. In some embodiments, the event archiving engine can offer one or more recommendations for suggested memento objects. For example, as the event archiving engine receives event content data, perhaps image data, the archiving engine can select one or more images to construct a real-world object. Perhaps the image data can be used to create photograph, a key chain, an image, a card, a figurine, a device, a moving object (e.g., action figure, bobble head, etc.) or other physical item that can be sent to the user. Such an approach is considered advantageous because it allows an entity to tailor or customize their memento to a specific event to strengthen the memory.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer implemented method of retrieving event information comprising:
   configuring a computing device to operate as an event archiving engine;
   receiving an event object, by the event archiving engine, the event object representative of an occurrence in time;
   binding the event object, by the event archiving engine, to a timeline associated with an entity where the timeline comprises a plurality of event objects organized according to time;
   selecting a selected event object from event objects bound to the timeline;
   generating indexing information based on a set of recognizable features related to a memento object, wherein the set of recognizable features comprises a vector of information derivable from a first digital representation of the memento object taken at a first time period, and wherein each member of the vector represents a different modality and includes (1) a listing of one or more relevant features for a corresponding modality, and (2) recognition criteria comprising a recognition threshold corresponding to the one or more relevant features;
   registering, by the event archiving engine, the generated indexing information in the timeline with the selected event object; and
   retrieving, by the event archiving engine, from the timeline the selected event object via the indexing information if a recognition criterion is met requiring that a minimum quantity of features of the set of recognizable features correspond to features derived from a second digital representation of the memento object taken at a second time period.

2. The method of claim 1, wherein the step of configuring the device to operate as the event archiving engine includes accessing at least one of the following: an application program interface, a search engine interface, a social network interface, a cell phone interface, a browser interface, and a sensor interface.

3. The method of claim 1, wherein the step of receiving the event object includes at least one of the following: pushing the event object, pulling the event object, automatically receiving the event object, and receiving the event object over a network.

4. The method of claim 1, wherein the event object comprises a media object.

5. The method of claim 4, wherein the event object comprises a multi-media object.

6. The method of claim 4, wherein the event object comprises at least one of the following types of data: audio data, video data, image data, motion data, acceleration data, temperature data, location data, time data, metadata, identification data, preference data, game data, and security data.

7. The method of claim 1, wherein the event object comprises a time stamp.

8. The method of claim 1, wherein the entity comprises at least one of the following: a person, an animal, a company, an organization, a group, a family, a school, a yearbook, a building, and a vehicle.

9. The method of claim 1, wherein the event object is representative of at least one of the following: a party, a concert, a sporting event, and an accident.

10. The method of claim 1, wherein the timeline comprises at least one of the following: a life stage, a life time, a year, a month, a week, and a day.

11. The method of claim 1, wherein the step of selecting the selected event object includes searching for the event object.

12. The method of claim 1, wherein the step of selecting the selected event object includes randomly selecting the selected event object.

13. The method of claim 12, wherein the step of selecting the selected event object includes randomly selecting the selected event objects from event objects within a specified time span on the timeline.

14. The method of claim 1, wherein the step of registering the set of recognizable features includes indexing the selected event object according to the set of recognizable features.

15. The method of claim 1, wherein the step of retrieving the selected event object includes searching for event objects having registered recognizable features corresponding to the derived feature.

16. The method of claim 1, wherein the set of recognizable features include at least one of the following: audio data characteristics, image data characteristics, color, shape, dimension of relevance, make, model, encoded data, non-encoded information, attributes, and texture.

17. The method of claim 1, wherein the derived feature set includes at least one of the following: audio data characteristics, image data characteristics, color, shape, dimension of relevance, make, model, encoded data, non-encoded information, attributes, and texture.

18. The method of claim 1, wherein the memento object comprises at least a substantially two dimensional object.

19. The method of claim 18, wherein the memento object comprises at least a three dimensional object.

20. The method of claim 19, wherein the memento object comprises at least a four dimensional object.

21. The method of claim 1, further comprising producing the memento object based on the selected event object.

22. The method of claim 1, wherein the memento object comprises one of the following: an image, a card, a figurine, a device, and a moving object.

23. The method of claim 1, wherein the step of selecting the selected event object includes selecting the selected event object based on a second, different timeline.

24. The method of claim 1, wherein the step of binding the event object to the timeline includes binding the event object to multiple timelines.

25. The method of claim 1, wherein the step of binding the event object includes recognizing objects within the event object.

\* \* \* \* \*